United States Patent [19]

Holay et al.

[11] Patent Number: 4,623,546
[45] Date of Patent: Nov. 18, 1986

[54] METHOD FOR MANUFACTURING CRISP RICE

[75] Inventors: Sanjay H. Holay, Rolling Meadows; James R. Kirkwood, Arlington Heights; Subodh K. Raniwala, Vernon Hills, all of Ill.

[73] Assignee: The Quaker Oats Company, Chicago, Ill.

[21] Appl. No.: 718,574

[22] Filed: Apr. 1, 1985

[51] Int. Cl.[4] ................................................ A23L 1/18
[52] U.S. Cl. ..................................... 426/448; 426/449
[58] Field of Search ................ 426/447, 448, 449, 450

[56] References Cited

U.S. PATENT DOCUMENTS

| | | | |
|---|---|---|---|
| 1,924,426 | 8/1933 | Anderson | 99/10 |
| 1,924,427 | 8/1933 | Anderson | 99/2 |
| 3,117,006 | 1/1964 | Wenger | 426/448 |
| 3,190,210 | 6/1965 | McComb et al. | 99/238 |
| 3,279,936 | 10/1966 | Forestek | 117/2 |
| 3,462,277 | 8/1969 | Reinhart | 99/81 |
| 3,591,468 | 7/1971 | Nishio et al. | 204/35 R |
| 4,094,749 | 6/1978 | Stange et al. | 204/25 |
| 4,309,115 | 1/1982 | Klein et al. | 366/79 |
| 4,325,976 | 4/1982 | Harrow et al. | 426/104 |
| 4,435,435 | 3/1984 | Hsu | 426/557 |
| 4,446,163 | 5/1984 | Galle et al. | 426/448 |
| 4,521,436 | 6/1985 | Lou et al. | 426/449 |

OTHER PUBLICATIONS

Luh, Bor S., and Bhumiratana, Amara, "Breakfast Rice Cereals and Baby Foods" From *Rice: Production and Utilization* Bor S. Luh ed., Westport, Conn., AVI Publishing Co., 1980, pp. 627–630.

*Primary Examiner*—George Yeung
*Attorney, Agent, or Firm*—Daniel W. Latham

[57] ABSTRACT

A method for making a crisp rice product comprising the steps of (a) extrusion-cooking a moist mix of ingredients the ingredients comprising at least about 50% uncooked rice flour on a dry weight basis, in a screw-type extruder, the screw-type extruder comprising an elongated barrel having a feed end and a discharge end and a passageway therebetween and a single elongated screw snugly and rotatably residing within the passageway, the screw having a non-adhesive, anti-stick coating; (b) expressing the cooked mix from the extruder through a die under expanding conditions; (c) cutting the expressed mix into discrete pieces; (d) drying the cut pieces, and (e) toasting the dried pieces.

7 Claims, No Drawings

METHOD FOR MANUFACTURING CRISP RICE

BACKGROUND

Crisp rice is a product frequently used in the manufacture of crisp candy bars, cookies, granola bars and other snacks and confections in addition to its well known use as a breakfast food.

A typical crisp rice process is an oven-puffing process which begins with whole kernels of rice. The rice kernels are first cooked in a retort for several hours together with sugar, salt and malt. The cooked kernels are then dried to a moisture content of 25% to 30%, tempered for about 15 hours to equilibriate moisture, and dried again to a moisture content of 18–20%. The dried kernels are then radiantly heated to plasticize the outside layers of the kernel, "bumped"0 on widely spaced flaking rolls, and tempered for 24 hours. The bumped kernels are then finally puffed and toasted in a toasting oven for 30–45 seconds. The resulting product is a highly expanded cereal product with a tender, crisp structure.

Given the number and complexity of steps in the typical oven puffing process, it would be desirable to produce a crisp rice suitable for use in a breakfast cereal or for use in snacks and confections by a simple extrusion puffing method in which uncooked rice flour is used as the starting ingredient.

Although extrusion-cooking of cereal flour mixtures to make puffed cereal products is well established in the cereal making art, difficulties have been observed when cereal flour mixtures containing high levels of uncooked rice flour have been extrusion-cooked. Specifically, we have found that rice flour mixtures having a rice flour content above about 50% may be extruded satisfactorily in a high pressure single screw extruder having a water cooled screw. However, after a period of operation varying from a few minutes to a few days, the output of the extruder may suddenly and unexpectedly drop, totally disrupting production of the product. Upon removing the screw from the extruder barrel after these stoppages, a hard, glassy substance is found to be adhering to the screw and filling the channels between adjacent screw flights, thereby blocking the flow of cereal flour mixture through the extruder. The exact reason for this "screw wrap" problem, which appears after a variable period of stable operation, is unknown. Other flours such as corn flour, wheat flour, and oat flour, when extrusion-cooked under substantially the same conditions, do not experience such severe screw wrap problems.

A time consuming-process of removing the glassy substance from the screw is required before cereal production can be resumed. This task can be a source of considerable production down-time. As a result, the screw wrap problem presents a significant obstacle to the economics and feasibility of the extrusion method for making crisp rice.

It is therefore an object of the present invention to provide an extrusion method for making a crisp rice product which avoids the screw wrap problem.

It is also an object of the present invention to provide an extrusion method for making a crisp rice product from rice flour that is organoleptically comparable to crisp rice produced by oven puffing of whole grain rice.

SUMMARY OF THE INVENTION

These and other objects are accomplished by the method for making crisp rice of the present invention. We have discovered a method for making a crisp rice product comprising the steps of (a) extrusion-cooking a moist mix of ingredients, the ingredients comprising at least about 50% uncooked rice flour on a dry weight basis, in a screw-type extruder, the screw-type extruder comprising an elongated barrel having feed end and a discharge end and a passageway therebetween and a single elongated screw snugly and rotatably residing within the passageway, the screw having a non-adhesive, anti-stick coating; (b) expressing the cooked mix from the extruder through a die under expanding conditions, (c) cutting the expressed mix into discrete pieces, (d) drying the cut pieces and (e) toasting the dried pieces.

DETAILED DESCRIPTION OF THE INVENTION

The method of the present invention comprises extrusion-cooking, expressing, cutting, drying and toasting a mix comprising at least about 50% uncooked rice flour.

By uncooked rice flour, we mean the product resulting from the milling of uncooked rice grains. The milled product of parboiled rice grains, although the starch therein is partially gelatinized, is also within the definition of uncooked rice flour as it is used herein. The uncooked rice flour is a rice flour which is ground sufficiently to provide a desired texture and expansion in the final product. Preferably it is ground finer than 60 mesh and most preferably finer than 80 mesh, but with the majority of rice flour granules coarser than 200 mesh. The uncooked rice flour can be derived from any rice variety.

The uncooked rice flour is made into a mix with water and with other ingredients desired to improve the taste, appearance, texture or storage stability of the crisp rice product. For example, sugar, salt, malt, flavoring, coloring and/or preservatives can be added. Also, additional cereal flour such as corn flour, oat flour, wheat flour and combinations thereof can be added. However, at least about 50% of the ingredients in the mix on a dry weight basis (preferably at least about 75% and most preferably at least about 90% of the ingredients on a dry weight basis) consists of uncooked rice flour.

Although mixing of the water and ingredients can be performed in many ways, preferably all of the ingredients are first mixed together in a dry form in a ribbon blender to provide a homogeneous mixture and then the dry, homogeneous mixture is sifted and fed into a paddle blender where water spray nozzles evenly hydrate the dry mixture. Alternatively, water could be added to the dry mixture by simultaneously injecting water and feeding the dry mixture into a screw type extruder.

The mix provided by the combination of uncooked rice flour, water and other ingredients, as described above, can provide a satisfactory crisp rice product at moisture contents in a fairly wide range, depending on which ingredients are to be included with the uncooked rice flour. We have found, however, that in a preferred embodiment in which uncooked rice flour is the only cereal ingredient, that a moisture content in the range of about 20% to 25% by weight is the most desirable moisture for the mix as it is fed into the extruder.

The mix or low moisture ingredients for making the mix, is then placed into a screw-type extruder where it experiences the temperature, pressure and mechanical action necessary to extrusion-cook the mix therein. A screw-type extruder having a generally conventional configuration is used. That is, the extruder comprises an elongated barrel having a feed end, a discharge end and a passageway therebetween and a single elongated screw snugly and rotatably residing within the passageway. In the extruder, the mix is urged by the rotation of the screw toward a shaping die at the discharge end of the barrel. During its progress through the extruder, the mix becomes a plastic mass which is worked and heated to cooking temperatures in excess of 212° F. which are well known in the expanded cereal art, preferably to temperatures in the range of about 300° F. to 350° F. At the same time, the plastic mass is subjected to pressures in excess of 500 psig, preferably reaching a peak pressure of at least about 1500 psig.

The conventional screw-type extruder suitable for cooking and forming cereals employs a screw with three distinguishably different sections. The first is a feed section by which the ingredients are conveyed from a hopper at the feed end of the barrel to an intermediate point in the barrel. The screw in the feed section typically has a relatively deep channel defined by both a screw root and a screw flight. The screw flight winds in a helical fashion around the root and extends from the root to a snug rotatable fit within the extruder barrel. The second section is a transition section in which the screw channel decreases gradually in depth, causing cereal ingredients in the transition section to be compressed, heated, and worked between the stationary extruder barrel and the rotating screw flight and the screw root. The third section is the metering section in which the screw channel remains at a shallow but relatively constant depth and through which the heated, plastic cereal ingredients are transported toward a shaping die at the discharge end of the extruder. The length of each of these screw sections, the pitch of the flights, the temperature control along the length of the screw and other characteristics of the extruder and the extrusion process can vary considerably in extrusion-cooking of cereals. The compression ratio of this type of screw is defined as the ratio of the cross sectional area of the helical channel in the feed section divided by the cross sectional area of the helical channel in the metering section. A compression ratio in the range of about 2-3 is typical for extrusion-cooking of cereals.

The extruder and its operating conditions, as heretofore described, are conventional in the cereal puffing art. However, we have discovered that such a combination of extruder and operating conditions on uncooked rice flour may result in screw wrap unless a screw having a non-adhesive, anti-stick coating is employed. By "non-adhesive, anti-stick coating" is meant that the screw has a coated surface with the inherent self-lubricating and non-stick properties which are well known in the food cooking art in connection with non-stick cookware and other non-stick food processing equipment. For example, non-stick coatings of polytetrafluoroethylene (PTFE) and co-polymers of tetrafluoroethylene with up to 15% by weight of other monomers such as ethylene, vinyl chloride vinyl fluoride and hexafluoropropene are well known in the non-stick cooking art and provide acceptable non-adhesive, anti-stick properties for the practice of the present invention. In addition to these familiar fluorocarbon polymers, other plastic materials are known to have similar non-adhesive, anti-stick properties at food cooking temperatures. For example, aromatic polyimide polymers, aromatic polyester polymers, and polyphenylene sulfide polymers are known to possess the self-lubricating character and temperature resistance needed to provide a coating with the type of non-adhesive anti-stick properties which are required in the practice of the present invention. Therefore, the extruder used in the method of the present invention comprises, in addition to those elements already recited as being conventional in the cereal art, an extruder screw having a non-adhesive, anti-stick coating.

While we do not wish to be bound by theories, we believe that the reason for the success of the present invention in preventing screw wrap while making a crisp rice product is that the non-adhesive, anti-stick properties of the coated screw prevents the adhesion of localized patches of heated rice flour mix to the screw. In an extruder extruding a rice flour mix without a screw with the non-adhesive, anti-stick screw properties employed in the present invention, localized hot spots on the screw caused by frictional heating could cause a rapid, localized heat transfer to the rice flour mix which is in contact with the screw. This localized heating phenomenon is most likely to affect the transition section of the conventional extruder screw, since frictional heating and compression of the rice flour mix is greatest in the transition section. This rapid heat transfer could drive out moisture in the rice flour mix, causing it to solidify and stick to the screw. Such sticky patches on the extruder screw could cause a substantial local impairment in the flow of material along the channel of the screw and contribute to a buildup of solid material in the channel which in a short time could completely block the channel. By utilizing a coated screw with non-adhesive, anti-stick properties which prevents these patches of rice flour mix from sticking to the screw, the transport of the mix in the screw channel can proceed in spite of localized hot spots on the screw.

We have also unexpectedly found that the same processing temperatures and pressures can be achieved to cook and work the rice flour mix in an extruder employing a non-adhesive, anti-stick screw as in an extruder employing a conventional screw. This is in spite of a substantial difference in the coefficients of friction between the non-adhesive, anti-stick screw and the conventional screw.

The non-adhesive, anti-stick properties needed on the extruder screw to prevent screw wrap can be easily achieved by coating the critical sections of a conventional extruder screw which compress and work the rice flour mix with commercially available polymer based coatings. Therefore, in the present invention, a coated screw is used in which at least the transition section of the extruder screw, as heretofore described, and preferably the metering section of the extruder screw or any other section of the extruder screw which significantly compress and work the rice flour mix are coated with a polymer based material which has non-adhesive, anti-stick properites. A coating on the entire screw is preferred.

Due to the harsh conditions prevailing on the screw during the operation of the extruder, it is highly desirable that the polymer based coating used in the present invention also have adequate wear resistance to allow sustained operation of the extruder. It is well known in the non-stick cooking art that blistering and peeling of the polymer from the substrate to which it is bonded is a common problem. It is also well known that polymers typically used to fashion non-stick cooking apparatus have poor hardness and wear characteristics. U.S. Pat. Nos. 3,279,936 and 4,094,749 address these problems by infusing polymers having non-adhesive, anti-stick properties into a hard, porous metal at the surface of the article to be coated. It is this type of polymer infused coating that is employed in the preferred embodiment of the present invention.

Commercially available coatings of the general type which are suited for use in the present invention include the NEDOX coatings of General Magnaplate Corporation of Linden, N.J. The NEDOX® coatings are composite coatings of a porous metal alloy material infused with a polymer having the non-adhesive, anti-stick properties already described. A two step process is required to make the NEDOX coated screw. A hard chrome-nickel alloy is first electrodeposited onto the surface of a conventional extruder screw to a thickness of about 0.0002 inch to 0.003 inch in a process which results in extreme porosity in the deposited alloy. The porous alloy is then infused with a fluoroplastic polymer which provides the coating with non-adhesive, anti-stick properties similar to the non-adhesive, anti-stick properties possessed by the polymer alone but which also retains a wear resistance similar to that possessed by the chrome nickel alloy.

After the rice flour mix has been extrusion-cooked in the extruder with the non-adhesive, anti-stick coated screw at temperatures in excess of 212° F. and maintained in the extruder at superatmospheric pressure, it is then expressed from the extruder through a shaping die at the discharge end of the extruder barrel. The cooked mix then expands rapidly as it emerges into atmospheric pressure due to the entrapped gases and superheated water within it. The expressed mix is then cut into discrete pieces of a desired size as it emerges from the die face. A typical desired size for the pieces is in the range of 2.5 mm to 10 mm in length.

The pieces must then be dried immediately to stabilize their expanded structures. It is preferred that hot air at temperatures in the range of about 170° F. to 230° F. be used to dry the pieces. Such a hot air stream applied to the pieces for a few seconds can reduce the moisture content of the pieces from about 20% to less than about 15%, a moisture content at which the pieces achieve a substantially stable structure. The pieces can then be toasted to develop a color and flavor that matches that of conventional oven-puffed crisp rice and also to reduce the moisture content to that required for stable long term storage. A fluidized bed toaster employing toasting temperatures in the range of about 400° F. to 500° F. can be used for 25-45 seconds to develop the proper color and flavor. A final moisture with a desirable level below about 3% is also achieved during toasting.

The following example illustrates and explains the invention but is not to be taken as limiting the invention in any regard.

EXAMPLE

Uncooked rice flour, sugar, salt and malt were mixed in the proportions indicated in a conventional ribbon mixer for about 10 minutes until a homogeneous mixture was achieved:
Rice flour: 91.0%
Sugar: 7.0%
Salt: 1.0%
Malt: 1.0%
The dry ingredients were then sifted into a conventional paddle blender where a fine spray of water was blended into the dry ingredients to bring them to a uniform moisture content of about 22% by weight.

The moist mix was then transferred from the paddle blender into an extruder having a screw with a 0.0002 to 0.003 inch thick NEDOX® SF-2 coating (from General Magnaplate Corporation of Linden, N.J.) and also with the required channel profile to give the extruder a compression ratio of about 2.6. The rice flour mix was therein heated and mechanically worked to a peak temperature of about 340° F. and a peak pressure of about 3,000 psig. At the discharge end of the extruder barrel, the cooked rice flour mix was expressed through a die having a multiple opening configuration at an elevated temperature and pressure, thereby causing the cooked mix to expand.

A vertical fly cutter with blades located close to the die face was then used to cut the expressed mix into discrete pieces in the desired size range. The pieces were then flash dried and conveyed to the toaster in an air stream at about 200° F. which reduced the moisture content of the pieces from about 20% to about 13%. The dried pieces were then toasted in a Jetzone Toaster at about 450° F. for about 35 seconds to develop the toasted appearance that is characteristic of oven-puffed crisp rice.

Although the above description and example of the invention are disclosed herein for the purpose of describing the invention to those skilled in the art, each and every modification and variation of the invention is not described in detail. It is intended, however, that all modifications and variations within the scope of the claims are to be included within the scope of the invention.

We claim:

1. A method for making a crisp rice product comprising the steps of:
   (a) extrusion-cooking a moist mix of ingredients, the ingredients comprising at least about 50% uncooked rice flour on a dry weight basis, in a screw-type extruder, the screw-type extruder comprising an elongated barrel having a feed end and a discharge end and a passageway therebetween and a single elongated screw snugly and rotatably residing within the passageway, the screw having, in a transition section thereof, a non-adhesive, anti-stick coating;
   (b) expressing the cooked mix from the extruder through a die under expanding conditions;
   (c) cutting the expressed mix into discrete pieces;
   (d) drying the cut pieces; and
   (e) toasting the dried pieces.

2. The method of claim 1 wherein the ingredients comprise at least about 75% by weight uncooked rice flour.

3. The method of claim 1 wherein the mix is extrusion-cooked at a moisture content in the range of about 20% to 25% by weight.

4. The method of claim 1 wherein the mix is extrusion-cooked at a peak pressure of at least about 1500 psig.

5. The method of claim 1 wherein the mix is extrusion-cooked in an extruder with a screw having a coating comprising a porous metal infused with a non-adhesive, anti-stick polymer.

6. The method of claim 1 wherein the mix is extrusion-cooked in an extruder having a compression ratio in the range of 2 to 3.

7. The method of claim 1 wherein the cut pieces are dried at a temperature in the range of about 170° F. to 230° F.

* * * * *